July 27, 1965  J. S. FISHMAN  3,196,920
TIRE CONSTRUCTION
Filed March 16, 1964
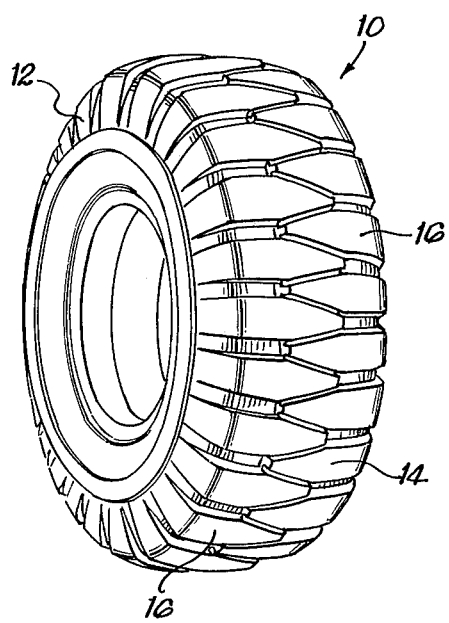
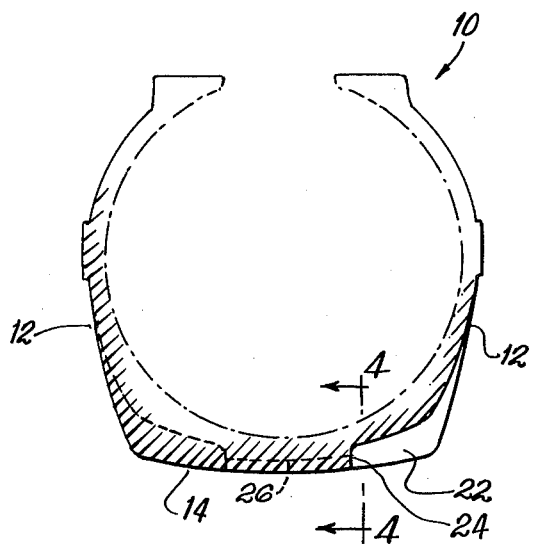
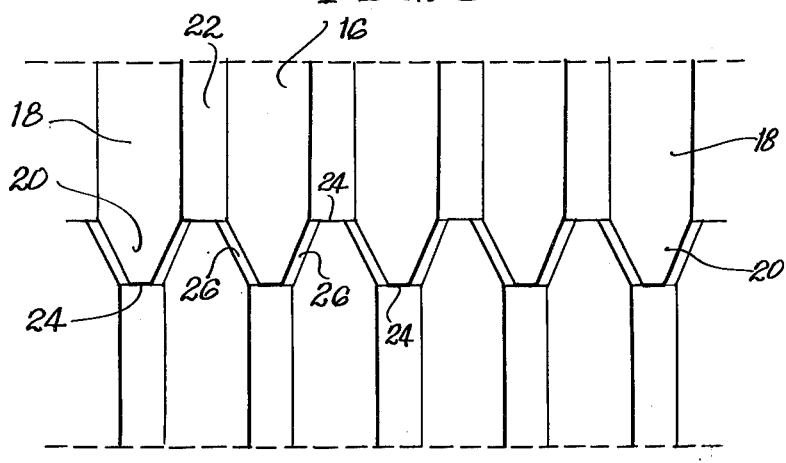
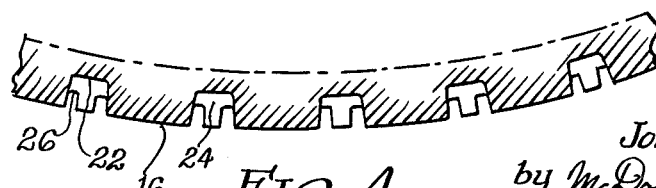
INVENTOR
Jordan S. Fishman
by McDougall, Hersh
and Scott
Attys

United States Patent Office 3,196,920
Patented July 27, 1965

3,196,920
TIRE CONSTRUCTION
Jordan S. Fishman, Chicago, Ill., assignor to Louis Fishman & Co., Inc., Chicago, Ill., a corporation of Illinois
Filed Mar. 16, 1964, Ser. No. 352,262
4 Claims. (Cl. 152—209)

This invention relates to a tire construction suitable for use on vehicles of various types. The invention is particularly directed to tires formed of rubber or related synthetic materials which are molded in accordance with conventional techniques. It is contemplated that solid tires as well as pneumatic tires can be produced in accordance with the techniques of this invention.

There are certain characteristics which are desired of tire constructions. It is important that such constructions be designed so that they will exhibit good traction whereby the tires will be satisfactory for use under varying road conditions and on various terrains. It is also desirable to provide tire designs which have a relatively smooth operation whereby noise generated by the tires can be kept to a minimum. Finally, tire designs which do not exhibit a high rate of wear are constantly being sought by those skilled in the art.

One difficulty encountered in the manufacture of tires is the combination of the above noted desirable characteristics into a single tire. Where maximum traction is achieved, it has been found that considerable noise and rapid wear characterize the tire operation. On the other hand, relatively smooth operation can be accomplished with certain tire designs; however, this is achieved at the expense of traction. The desirable combination of features is most difficult to obtain with tires which are designed for use on trucks and other large vehicles. Such vehicles must operate under more difficult conditions, in many cases, and traction in particular is a highly important consideration.

It is an object of this invention to provide a tire design which combines various desirable features of tire construction.

It is a further object of this invention to provide a tire design which is characterized by the ability to provide a great deal of traction under a variety of conditions.

It is an additional object of this invention to provide a tire design which is suitable for use both as a steer tire and as a drive tire.

It is a still further object of this invention to provide a tire design which is particularly suitable for use on truck constructions and on other large vehicles.

These and other objects of this invention will appear hereinafter and for purposes of illustration but not of limitation, a specific embodiment of this invention is shown in the accompanying drawing in which:

FIGURE 1 is a perspective view of a tire construction characterized by the features of this invention;

FIGURE 2 is a cross sectional view of the tire construction shown in FIGURE 1;

FIGURE 3 is an enlarged diagrammatic view illustrating the tread design of a tire of this invention; and FIGURE 4 is an enlarged fragmentary sectional view taken about the line 4—4 of FIGURE 2.

The tire of this invention is characterized by a tread design which combines several desirable features in a single construction. The tread design comprises a plurality of individual strip sections which are formed integrally with the tire body. Each of the strip sections includes a portion extending into the wearing surface of the tire and these portions overlap in the central area of the wearing portion. Recesses are defined between the adjacent strip sections whereby highly desirable gripping characteristics are realized.

The particular design of the strip sections making up the tread comprises the essential novelty of this invention. These strip sections preferably include a relatively straight portion which extends into a tapered end portion. The tapered end portion is formed in the center of the tire and the end portions of strips extending from opposite sides of the tire overlap. Relatively narrow recesses are formed between the tapered end portions while relatively wide recesses are defined between adjacent straight portions of the strips. The differences in the wide and narrow recesses are believed to provide a cooperating relationship which accomplishes the desirable gripping action of the tread. Furthermore, the cross over at the center in combination with the narrower center strip portion provides for use of the tire as both a steer and drive tire. This design has been found to be particularly suitable for solid tires.

FIGURE 1 illustrates a tire 10 which includes side walls 12 and a tread 14. The tire illustrated is a pneumatic tire but a solid tire design is considered an important application of this invention. The tread 14 includes a plurality of strip sections 16, these sections being formed integrally with the tire body. Generally speaking, the tire construction illustrated can be manufactured by conventional tire making techniques. In the mold structure employed, the center mold structure which defines the cross over must come out of the mold due to the undercut.

Each of the strip sections includes a relatively straight portion 18 and a tapered end portion 20. The strip sections extend from the side walls 14 into the wearing portion of the tread and the tapered ends of the strips overlap in this wearing portion to provide the illustrated arrangement.

Wide recesses 22 are defined between the straight portions of adjacent strip sections. These recesses extend to the truncated ends 24 which are defined by the tapered portions 20. A pair of narrow recesses 26 communicate with each of the wide recesses whereby a substantial gripping action can be achieved by the tire.

As best shown in FIGURES 2 and 4, it will be noted that the wide recesses 22 are deeper than the narrow recesses 26. Furthermore, the straight portions 18 of these strip sections are substantially wider than the recesses 22. In a typical embodiment, the straight portions of the strip sections are about three inches wide with the wide recesses being about one inch wide and the narrow recesses about ½ inch wide. The wide recesses are about one inch deep and the narrow recesses about ½ inch deep.

A tire having a tread design of the type described has been found to be highly satisfactory from a performance standpoint. A great deal of traction can be achieved with the tire without sacrificing smooth operation to a significant extent. Furthermore, the design does not result in an excessive rate of wear of the tread. The use of the tread design on trucks and similar large vehicles constitutes an important aspect of this invention.

The tire design of this invention is also considered highly satisfactory from a manufacturing standpoint. The relatively uncomplicated design simplifies mold manufacture as well as the tire molding operation. Accordingly, the advantages of the tire design can be achieved without a sacrifice of economy and efficiency.

It will be understood that various changes and modifications may be made in the above described construction which provide the characteristics of this invention without departing from the spirit thereof particularly as defined in the following claims.

That which is claimed is:
1. In a tire construction, the improvement in a tread design comprising a plurality of strip sections formed on the tread wearing surface, said sections incuding a straight portion and inwardly tapering end portions, said straight portions being longer than said tapered end portions, said sections extending at right angles from the side walls of said tire toward the center of said wearing surface with said end portions overlapping, and including recesses defined between the adjacent sections comprising wide recesses defined between the straight portions of adjacent sections and narrow recesses defined between adjacent overlapping ends of said sections, said tapered end portions being truncated and said wide recesses extending to each truncated end, a pair of narrow recesses communicating with each wide recess and extending along either side of each tapered end, said wide recesses being deeper than said narrow recesses.

2. In a tire construction, the improvement in a tread design comprising a plurality of strip sections, said sections being formed on both side walls of the tire and extending into the tread wearing surface, said sections including a straight portion and inwardly tapering end portions with said straight portions being longer than said tapered end portions, said sections extending at right angles from the side walls of the tire toward the center of said wearing surface with said end portions overlapping, and including recesses defined between adjacent sections, said recesses extending into the side walls of the tire and comprising wide recesses defined between the straight portions of adjacent sections and narrow recesses defined between adjacent overlapping ends of said sections, said tapered end portions being truncated and said wide recesses extending to each truncated end, a pair of narrow recesses communicating with each wide recess and extending along either side of each tapered end, and wherein said wide recesses are deeper than said narrow recesses.

3. In a tire construction, the improvement in a tread design comprising a plurality of strip sections formed on the tread wearing surface, said sections including a straight portion and inwardly tapering end portions, said straight portions being longer than said tapered end portions and said sections extending from the side walls of said tire toward the center of said wearing surface with said end portions overlapping, and including recesses defined between the adjacent sections comprising wide recesses defined between the straight portions of adjacent sections and narrow recesses defined between adjacent overlapping ends of said sections, said wide recesses extending to each tapered end portion, with a pair of said narrow recesses communicating with each wide recess and extending along either side of each tapered end portion, said wide recesses being deeper than said narrow recesses.

4. A construction in accordance with claim 3 wherein said tire comprises a solid tire.

References Cited by the Examiner

UNITED STATES PATENTS

| D. 104,503 | 5/37 | Partehheimer. |
| D. 168,675 | 1/53 | Custer. |

FOREIGN PATENTS

| 553,327 | 5/43 | Great Britain. |

ARTHUR L. LA POINT, *Primary Examiner.*